United States Patent Office 3,158,332
Patented Nov. 24, 1964

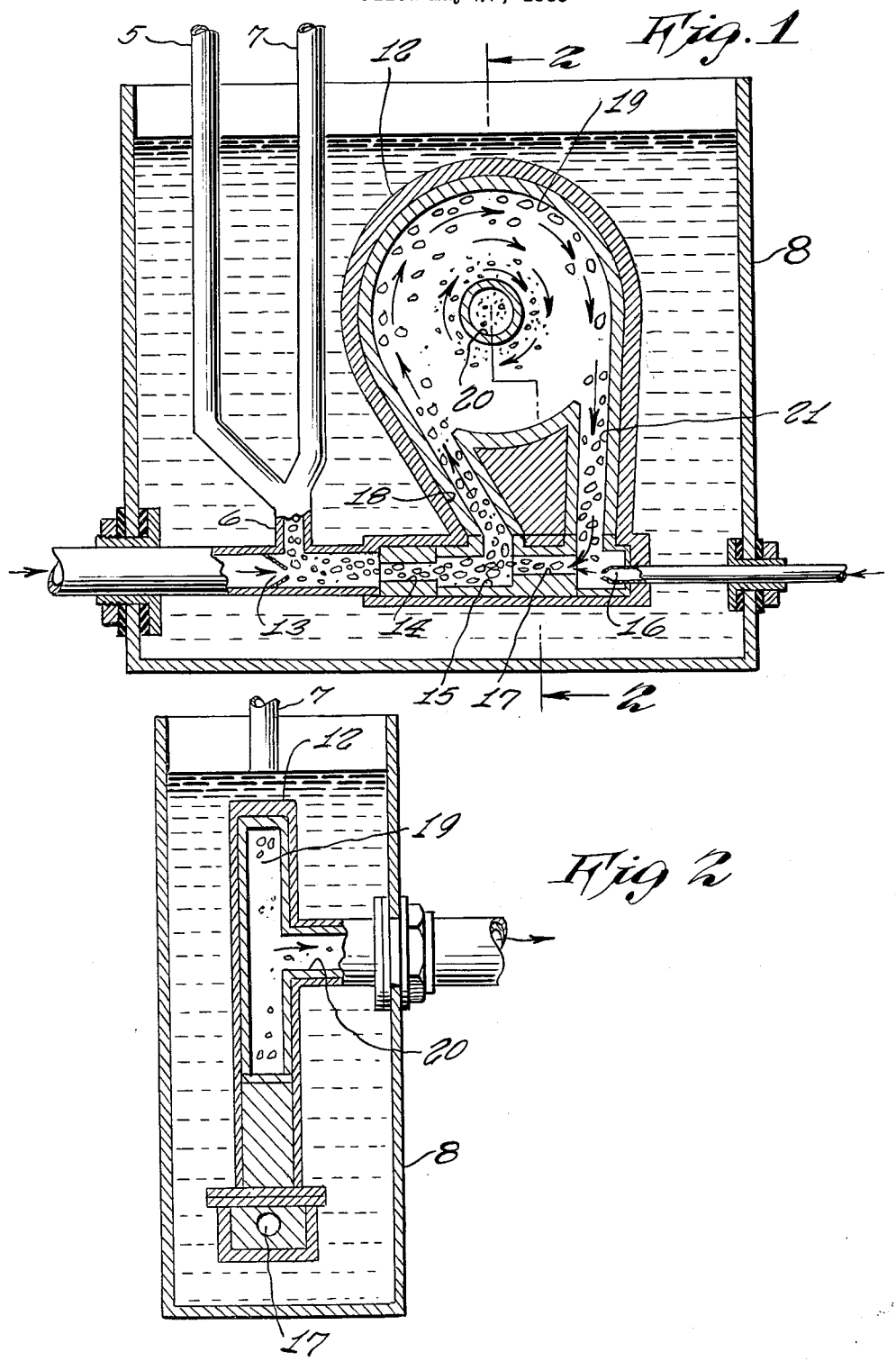

3,158,332
METHOD OF PREPARING SUBLIMATE COLLOIDAL IODINE
Wilbert Moody Wilson, Morristown, N.J., assignor to George W. Helme Company, Helmetta, N.J.
Filed May 27, 1963, Ser. No. 283,492
3 Claims. (Cl. 241—5)

This invention relates to the production of colloidal iodine solutions from sublimated iodine.

Colloidal iodine is highly desirable for various uses, such as fungicide, viricide, and the like.

It is important in such cases that the iodine be protected by a protective colloid of low iodine number.

It is also important that the colloidal iodine be of substantial purity, especially in cases where it may be used intravenously or as a stomach capsule.

It is an object of this invention to prepare a colloidal iodine solution of great purity.

It is another object to prepare a colloidal iodine solution using a fluid energy mill to obtain the colloid particle size.

These and other objects of this invention will become apparent upon reading the following descriptive disclosure taken in conjunction with the accompanying drawing in which;

FIG. 1 is a vertical section view of a Trost jet mill, modified as to its feed inlet, and showing the opposing jet streams used to pulverize solid particles to particles within the colloidal range.

FIG. 2 is a section view taken on line 2—2 of FIG. 1 and showing the construction of the exit orifice.

Iodine is best purified by sublimation whereby deleterious material is left behind in the retort.

An important feature of this invention is the immersion of the Trost jet mill in a bath of dry ice thereby cooling the mill to about minus 20 degrees Fahrenheit or less and effecting low temperature grinding on very friable iodine particles.

In preparing the iodine protective colloid solution of this invention a water soluble gum protective colloid solution is first prepared.

Preferably this solution is prepared from water and gum arabic. But gum tragacanth and even water soluble synthetic resins made from polyethylene oxide and the like of low iodine number are operable. Also other liquids in lieu of water are operable. The amount of protective colloid used varies from one-tenth of one percent to about thirty-five percent of the weight of water.

The iodine is obtained as a commercial product of relatively high purity from Chile or from California.

It is placed in a conventional glass retort and sublimated.

The sublimate is led into conduit 5 of the bifurcated inlet conduit 6, the other bifurcation 7 being the conduit through which the prepared gum arabic solution is introduced.

The feed of iodine sublimate through conduit 5 and of gum arabic solution through conduit 7 is conducted into the common conduit 6 and thence to the orifice of the inlet jet nozzle 13.

The air pressure used in the opposing jet streams varies from 80 pounds to about 150 pounds per square inch.

The mixture of gum arabic solution and iodine vapor is then propelled through conduit 14 and expanded in chamber 15, the grinding chamber.

As shown in the drawing, an opposing jet nozzle 16 conducts its stream of air through conduit 17 into said chamber 15.

In chamber 15, the water of the gum arabic solution is vaporized so that a cooling effect on the grinding iodine particles is obtained.

An essential feature of this invention is the cold grinding of iodine particles at from zero degrees Fahrenheit to as low as minus 30 degrees Fahrenheit.

To obtain such cold grinding temperatures, the entire Frost mill is placed in a container 8 in which Dry Ice or a solution of Dry Ice and acetone is disposed. Cold brine solution may be used in lieu of Dry Ice if desired.

Thus the grinding of iodine sublimate in the presence of vaporized gum arabic is done at a low temperature. The result is that colloidal size iodine particles protected by a sheath of gum arabic are propelled up conduit 18 against the housing 12. The stream of colloidal particles from conduit 18 are directed as a suitable angle so that a centrifugal effect is produced in housing 12 thereby making it in effect a classification chamber. The heavier particles move adjacent to the inner wall 19 of housing 12.

The fine colloidal particles are removed through a centrally located exit orifice 20. The residual heavier colloidal particles moving along curved wall 19 move into conduit 21 and thence are brought to recycle stream nozzle 16 whench they are propelled into chamber 15 to be ground therein.

Thus the process of this invention prepares colloid protected iodine particles of colloidal size at low temperatures. Temperatures at which cold iodine is very friable. And temperatures at which the heat of grinding is readily disposed both, internally due to expansion of gas and water vapor and externally by contact with the cold housing.

As an example of this invention, a stream of iodine sublimate was sucked from a heated retort into conduit 5 and an aqueous solution containing 12 percent gum arabic was introduced as a slowly moving stream in conduit 7.

An air pressure of 120 pounds per square inch was used at both nozzles 13 and 16.

The mill was disposed in a container and was surrounded with crushed Dry Ice for one half hour before use and during use.

The colloidal iodine prepared and issuing from exit orifice 20 was trapped in water and was ready for use when a concentrate containing 40 percent colloidal iodine was obtained.

The rapidity of iodine sublimate fed is controlled so as to yield a minimum of recycle iodine.

When a one percent and a thirty percent gum arabic solution was used, like favorable results were obtained at orifice 20.

This invention embraces the concept of grinding sublimate in the absence of externally induced cold temperatures, although such cold apparatus temperatures are preferred.

Thus relatively cool grinding atmosphere is obtainable from the expansive vaporization effect of the liquid used as the slurry medium, said liquid being a non-solvent or substantially a non-solvent of iodine.

This invention has been described by means of several embodiments but it is not to be limited to these embodiments since it is of a broader scope than these illustrations thereof.

I claim:

1. In the process of preparing colloidal iodine by use of inlet and recycle opposing jet streams of air in a Trost colloid mill the improvement comprising adding iodine sublimate to a protective colloid solution to form a slurry mixture of a suitable amount of liquid, introducing said slurry mixture to the inlet air jet stream, vaporizing with cooling said liquid by expansion in the grinding chamber and grinding said iodine sublimate particles with recycle iodine particles in said vaporous atmosphere.

2. The process of claim 1 comprising cooling said Trost mill to below zero degrees Fahrenheit before grinding said iodine particles.

3. The process of claim 2 wherein the colloid mill is cooled to from zero degrees to minus thirty degrees.

References Cited by the Examiner

UNITED STATES PATENTS

| 2,460,546 | 2/49 | Stephanoff. | |
| 2,735,626 | 12/56 | Trost | 241—39 |
| 2,846,150 | 8/58 | Work | 241—5 |

ANDREW R. JUHASZ, *Primary Examiner.*

UNITED STATES PATENT OFFICE
CERTIFICATE OF CORRECTION

Patent No. 3,158,332　　　　　　　　　　　　　　November 24, 1964

Wilbert Moody Wilson

It is hereby certified that error appears in the above numbered patent requiring correction and that the said Letters Patent should read as corrected below.

Column 2, line 13, for "Frost" read -- Trost --.

Signed and sealed this 11th day of May 1965.

(SEAL)
Attest:

ERNEST W. SWIDER　　　　　　　　　　　　　　EDWARD J. BRENNER
Attesting Officer　　　　　　　　　　　　　　Commissioner of Patents